(12) United States Patent
Stradiot et al.

(10) Patent No.: US 12,414,548 B2
(45) Date of Patent: Sep. 16, 2025

(54) POULTRY WATERER

(71) Applicant: The Drinking Post L.L.C., Denver, CO (US)

(72) Inventors: Michael John Stradiot, Aurora, CO (US); Bradley Piper, Aurora, CO (US)

(73) Assignee: The Drinking Post L.L.C, Denver, CO (US)

( * ) Notice: Subject to any disclaimer, the term of this patent is extended or adjusted under 35 U.S.C. 154(b) by 160 days.

(21) Appl. No.: 18/349,870

(22) Filed: Jul. 10, 2023

(65) Prior Publication Data

US 2024/0049690 A1     Feb. 15, 2024

Related U.S. Application Data

(60) Provisional application No. 63/367,929, filed on Jul. 8, 2022.

(51) Int. Cl.
*A01K 39/022* (2006.01)
*A01K 7/06* (2006.01)
*A01K 39/02* (2006.01)
*A01K 39/026* (2006.01)

(52) U.S. Cl.
CPC ........ *A01K 39/0213* (2013.01); *A01K 39/022* (2013.01); *A01K 39/026* (2013.01)

(58) Field of Classification Search
CPC .... A01K 39/0213; A01K 39/022; A01K 7/06; E03B 9/20
USPC ...................................... 119/75, 76
See application file for complete search history.

(56) References Cited

U.S. PATENT DOCUMENTS

| | | | | |
|---|---|---|---|---|
| 1,563,414 A * | 12/1925 | Wierdsma | A01K 39/02 | 119/76 |
| 1,739,290 A * | 12/1929 | Chesnutt | A01K 39/0213 | 119/72 |
| 1,894,563 A * | 1/1933 | Jones | A01K 39/02 | 119/76 |
| 2,762,333 A * | 9/1956 | Smith | A01K 7/02 | 119/81 |
| 2,825,909 A * | 3/1958 | Morris | A47K 3/28 | 4/601 |
| 3,184,762 A * | 5/1965 | Logan | E03C 1/16 | 4/601 |
| 3,187,349 A * | 6/1965 | Booker | E03B 9/20 | 285/129.1 |
| 3,272,181 A * | 9/1966 | Ramsey | A01K 7/06 | 239/32 |
| 3,831,558 A * | 8/1974 | Forbes | A01K 7/06 | 119/73 |
| 4,924,812 A * | 5/1990 | Bernays, Jr. | A01K 7/06 | 119/76 |
| 6,279,508 B1 * | 8/2001 | Marchant | A01K 7/06 | 119/76 |
| 6,526,916 B1 * | 3/2003 | Perlsweig | A01K 7/06 | 239/29.5 |
| 6,776,121 B2 * | 8/2004 | Anderson | A01K 7/022 | 119/76 |
| 11,490,591 B1 * | 11/2022 | Stradiot | A01K 7/06 | |
| 11,490,592 B1 * | 11/2022 | Stradiot | A01K 7/06 | |
| 2008/0163821 A1 * | 7/2008 | Lytle | A01K 7/06 | 119/76 |
| 2013/0160714 A1 * | 6/2013 | Forbes | A01K 7/06 | 119/74 |

* cited by examiner

*Primary Examiner* — Monica L Perry
(74) *Attorney, Agent, or Firm* — Shaver & Swanson LLP; Scott D. Swanson

(57) ABSTRACT

A frost free poultry watering device that connects to a water supply. The device is installed partially buried, in particular in areas that have freezing weather conditions. A pedestal inserts into the ground and houses a water supply conduit. The water supply conduit connects to an underground source of water. The device has a manifold having one or more arms each having a poultry watering nipple attached thereto. The manifold is in fluid connection with the water supply conduit. A poultry, such as a chicken, steps on the step, causing the step to move down. The downward movement of the step actuates a valve that opens the fluid connection between the water source and the water supply conduit, allowing water to flow to the nipple(s). Preferably a second valve is positioned on the water supply conduit that opens to drain the conduit when the poultry steps off the step.

9 Claims, 5 Drawing Sheets

POULTRY WATERER

CROSS-REFERENCE TO RELATED APPLICATIONS

This application claims the benefit of U.S. Provisional Application No. 63/367,929 filed Jul. 8, 2022 the disclosure of which is incorporated by reference.

FIELD OF THE INVENTION

The disclosure generally relates to the field of livestock waterers. Particular embodiments relate to frost free hydrants for supplying poultry with a water source.

BACKGROUND OF THE INVENTION

Frost free livestock drinking hydrants have been provided in the industry for livestock such as goats, horses, and cattle. An example is found in the Applicant's livestock waterer, such as found at U.S. patent application Ser. No. 16/423,703. Typical livestock waterers attach to a below-ground water supply by a conduit. The conduit provides water from the below ground supply to a bowl or receptacle positioned on a pedestal. The conduit extends in the pedestal between the water supply and the bowl. A valve is positioned along the conduit and below the frost line. The valve is operable by a paddle or button in the bowl such that a livestock can actuate the paddle with the livestock's snout or nose. Actuation of the paddle causes the bowl to fill with water, and releasing of the paddle causes the water flow to stop and the bowl to drain. While these devices works well for four legged livestock, it does not provide an adequate poultry waterer.

SUMMARY

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined herein.

What is disclosed is a non-electric, frost free Poultry Water. Without using any basins to store water or electricity to heat water, we've created an on demand water source for Poultry. Preferred embodiments provide freely available water for a large number of poultry, such as up to 30 chickens.

The device has a manifold for distributing water from a source, said manifold having at least one arm extending to a poultry watering nipple. Preferably the manifold has a series of arms, with the depicted embodiment having four arms. A vertical support pedestal extends into the ground and supports the device. The vertical support pedestal is preferably a section of pipe. The vertical support pedestal is a tubular member having a coaxial water-carrying conduit therein and defining an annular interspace. The water supply conduit is in fluid communication with the manifold and a water support. The water-carrying conduit is a vertically oriented pipe configured for connection to a water source, such as city water or well water.

The device has a first valve interconnecting the water-carrying conduit and the water source. The valve opens to allow water delivery to the manifold. A reciprocable actuator rod is attached to the first valve means and disposed within the annular interspace. The rod is operatively connected to a step positioned outside of said vertical support means and configured for vertical movement relative to said vertical support pedestal, wherein the step is configured for poultry to step on the step causing the step downward relative to said vertical support pedestal. The step is operatively connected to said reciprocable actuator rod to cause said reciprocable actuator rod to open said first valve when poultry steps on said step. The step can be configured as a platform that circumvolves the pedestal support. In this embodiment the step hangs from the platform, and when the poultry steps on the step both the step and manifold move downward. In this embodiment the conduit has a water boot that allows for a break in the conduit such that the upper conduit section can freely move, with the water boot providing a flexible section of the conduit.

Preferably the step circumvolves said tubular member and configured to slide along said tubular member to actuate said first valve. In a preferred embodiment the step hangs from the manifold. A second valve is preferably positioned and configured to drain the manifold and the conduit when the first valve is in the off position. This second valve can be operatively connected to the step or the valve, or to the actuating rod.

DESCRIPTION OF THE INVENTION

Figure 1:
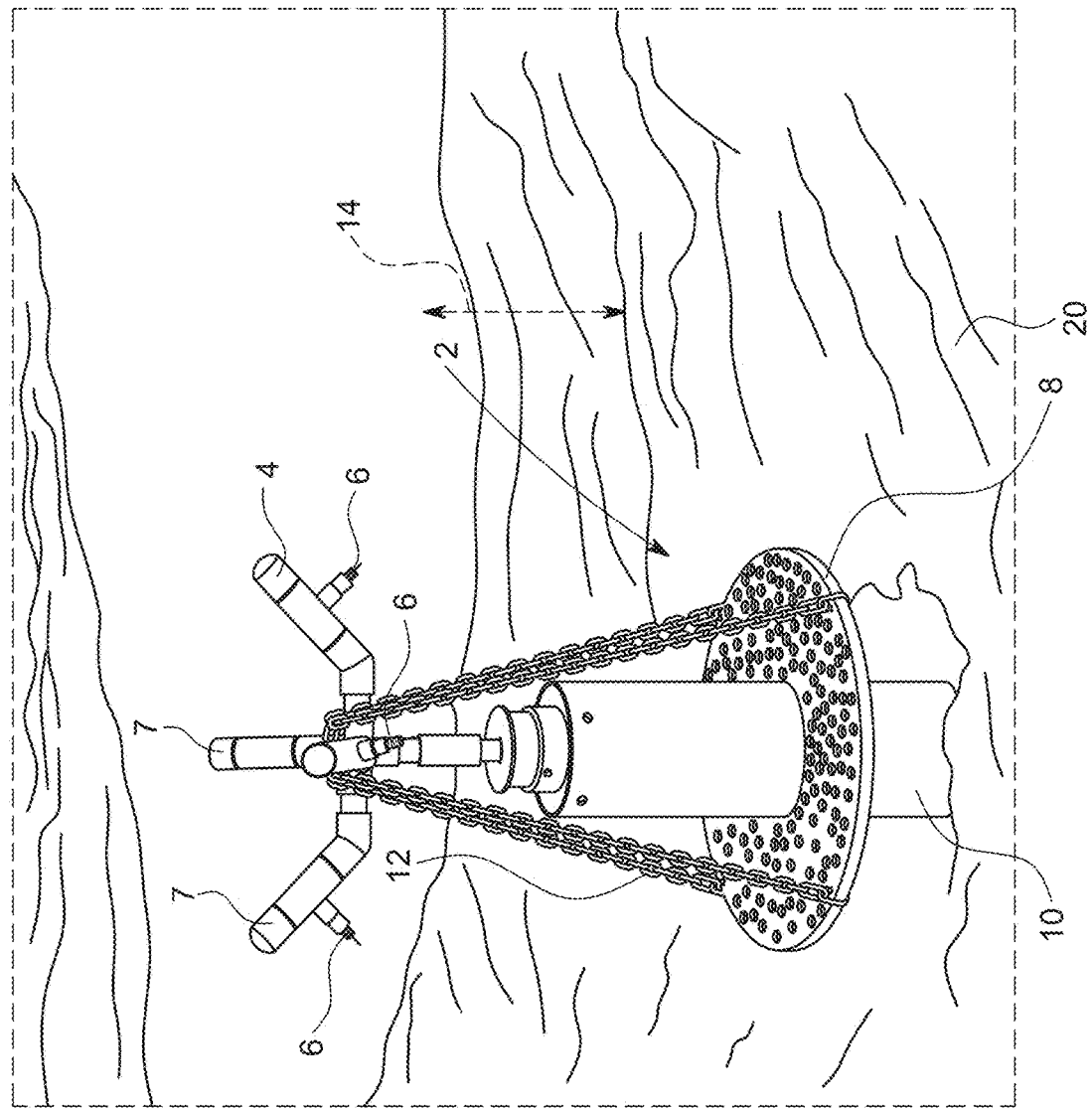
FIG. 1 is a perspective view of an embodiment of the invention.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

The waterer is connected to a water supply line below the frost line and uses a stop and drain valve to allow the manifold of the waterer to fill when activated by a poultry, and to automatically drain when the poultry is no longer activating the valve leading to the manifold. This allows for a water to provide water to the poultry at below freezing temperatures. The poultry step onto the platform to use the waterer and this engages and opens our valve. Water fills from the valve through a ½ " CPVC line into our manifold, split 4 ways and pressurizes the nipples at 5-30 PSI. The poultry can now access fresh and clean water. Once the poultry is done drinking, the poultry steps off of the platform and the waterer is cleared by gravity entirely of any remaining standing water to a leach field below the waterer.

The device utilizes a similar pipe extending from above ground to the water supply as found in the above referenced patent application. A conduit extends through the pipe from the water supply to a manifold configured for providing water to one or more poultry, such as chickens. The manifold is configured with a step such that the weight of poultry stepping on the step causes the manifold to move downward, causing the valve to the water supply to open, allowing water to flow to the manifold.

Preferably the poultry waterer has a rod that operatively extends between the manifold and the valve to open the valve when poultry steps on the manifold. A water conduit extends between the manifold and the valve such that poultry stepping on the step causes the causes the rod to depress the valve.

In a preferred embodiment the rod is connected directly to the manifold, although the rod can be connected to the step. In this embodiment a water retention boot is positioned on the conduit between the manifold and the valve. The water retention boot is a flexible, water tight boot that allows the manifold to move vertically downward relative to the valve when poultry step on the step. The boot allows the manifold to move while allowing the conduit vertically below the boot to remain stationary. Thus the manifold and conduit above the boot are movable, while the conduit below the boot is stationary. This decoupling of the valve from the manifold allows the manifold to move vertically, thus allowing the rod to move vertically with the manifold, opening and closing the stationary valve as the poultry step onto and off of the step. The rod can be positioned in the water conduit, or run alongside the conduit.

In a preferred embodiment the rod is a ³⁄₁₆" stainless steel rod. To allow the stainless steel rod to open the valve, it will connect from the valve at the bottom of the water to the inside of the manifold. For the valve to open, the manifold and upper portion of the poultry waterer (platform and manifold) must move downward ¾ ". The Water Retention Boot is extends to cover approximately a ⅓" gap in the conduit, which in a preferred embodiment is a ½" CPVC line. This allows the supply line to remain watertight, but will also allow for the top portion of the supply line and the manifold to move downward and pressurize.

In the depicted embodiment the step is an annular step positioned around the pipe that extends into the ground. The step, shown as platform, slides downward on the pipe when poultry step on the platform. The support chains extend from the platform to the manifold. When poultry step on the platform, the weight causes the platform to move downward, pulling the manifold downward via the chains.

When the poultry is finished drinking, a spring causes the manifold and step to return to the normal, extended position. This raises the manifold and causes the rod to close the valve. The system includes a second valve that causes the conduit to drain when free of pressure from the water supply. The concept of the second valve is discussed, for example, in the Applicant's disclosure in U.S. patent application Ser. No. 16/423,703, the contents of which are incorporated by reference, as is the actuator rod.

To activate the valve, an animal presses (or stands) on a platform. This action causes the entire top end of the waterer, including the manifold, to move down. The platform in a preferred embodiment is operatively connected to the manifold causing the manifold to move down with the platform.

Figure 2:
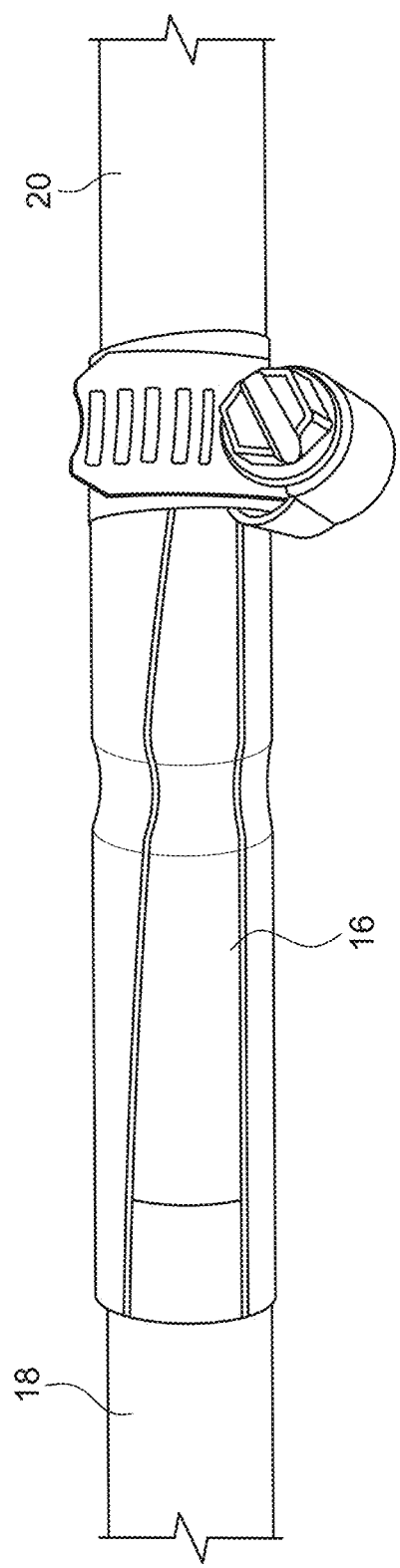
FIG. 2. is a perspective view of a water retention boot allowing for slidability of the manifold on the pedestal.
Figure 3:
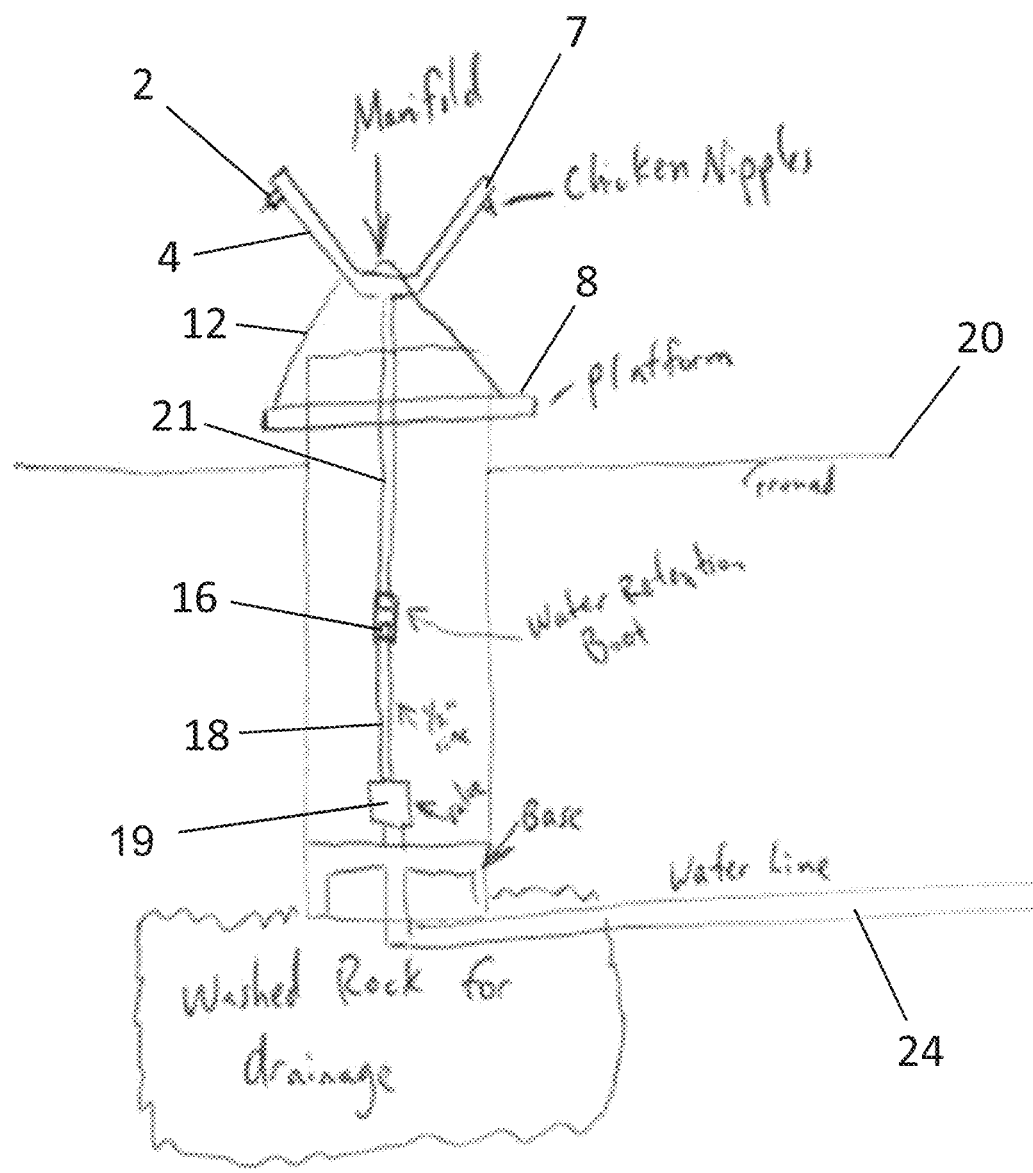
FIG. 3. is a section view of an installed poultry waterer.
Figure 4:
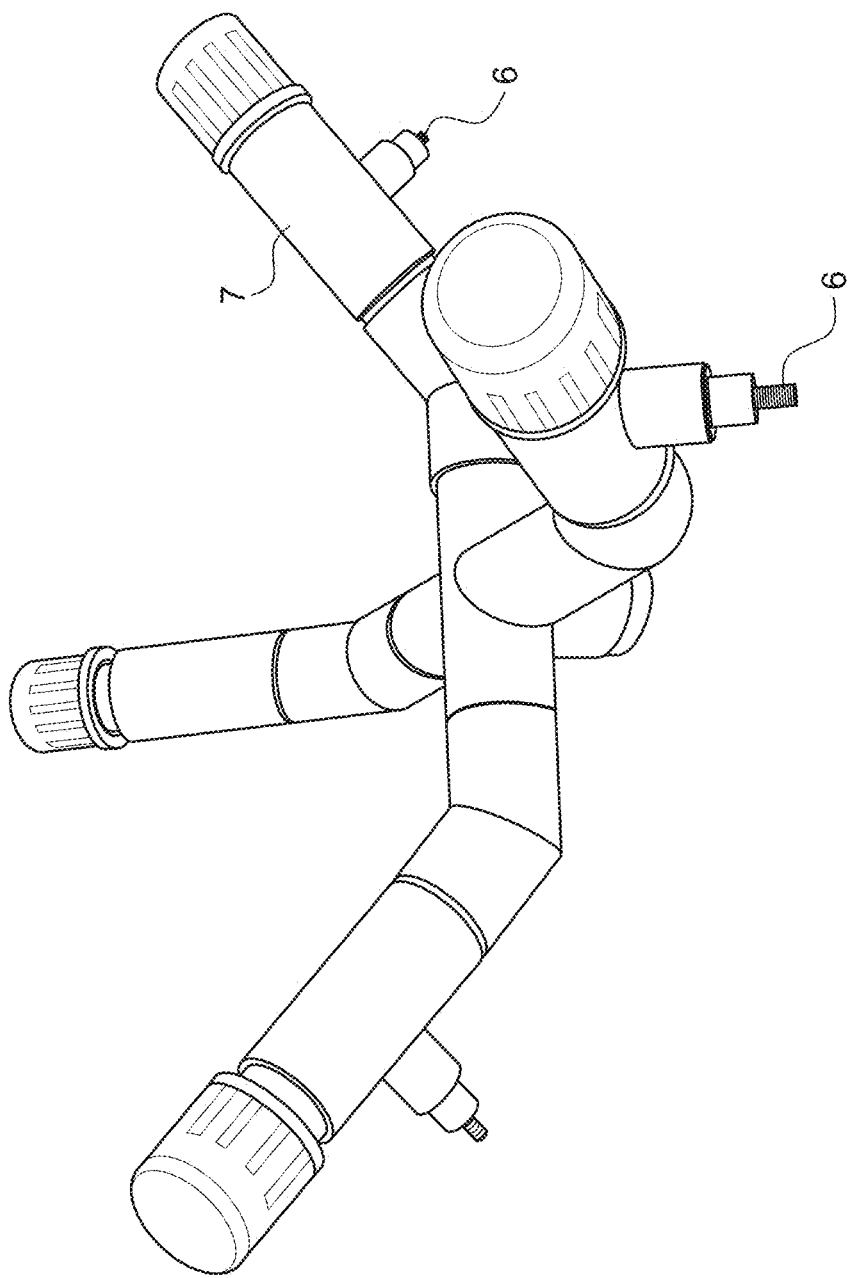
FIG. 4. is a top perspective view of a delivery manifold.
Figure 5:
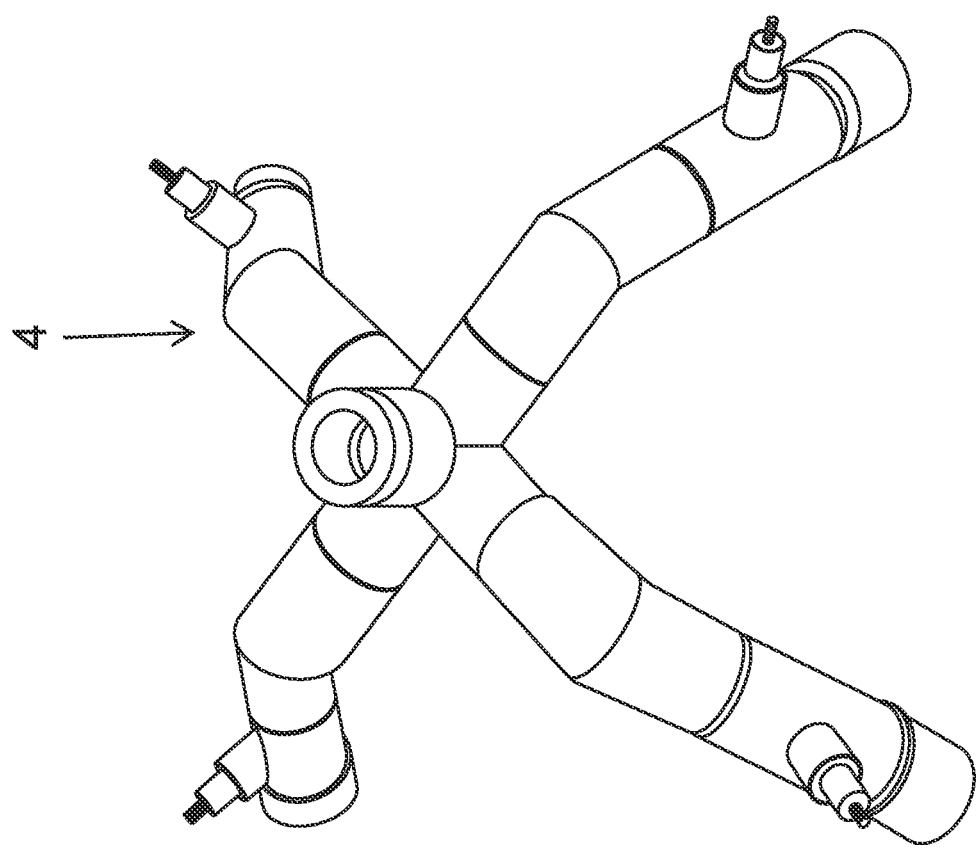
FIG. 5. is a bottom perspective view of the delivery manifold of FIG. 4.

FIGS. 1-5 depict a preferred embodiment of a poultry water 2. A pedestal base 10 is provided of a pipe or tube. A manifold 4 extends above the base. The manifold supports a platform or step 8 that circumvolves the base. The step is supported by three chains 12. The manifold has four arms 7 that extend to nipples 6. The poultry stepping on the step causes the step and platform to move downward while the poultry stepping on the step causes the step and manifold to return to a closed position. The directional arrow 14 indicates the vertical movement. The tubular base 10 extends into the ground 20 below frost level.

A water conduit connects the manifold to a source of water. A first valve 19 is positioned on the conduit between the water source and the manifold. An actuator rod is operatively connected to the step such that a poultry stepping on the step opens the valve. The connection can be direct to the step or to the manifold if the manifold slides with the step. In the depicted embodiment the rod is connected to the manifold. The conduit is provided in an upper section 20 and a lower section 18 of the conduit that are connected by a water retention boot. This water retention boot allows the upper section of conduit 20 to move with the manifold and step, yet retain water tightness.

In a preferred embodiment there is a physical break on the water supply/drain line that is covered by a water retention boot. This device allows the entire top half of the waterer to move down to activate the valve and pressurize the manifold with water. Alternate devices can be used that actuate the device. For example, the platform can be connected to the rod, with the manifold remaining stationary.

The waterer is configured to drain the manifold when the valve is not actuated by poultry. When a poultry puts pressure on the Platform, water will turn on and pressurize the Manifold. At this point, poultry can drink water out of the nipples located on the manifold. When the poultry steps off of the platform, the valve turns off and all water drains out of the manifold. In a preferred embodiment the manifold utilized a series of conduit arms to deliver water to a series of nipple waterers.

Still other features and advantages of the presently disclosed and claimed inventive concept(s) will become readily apparent to those skilled in this art from the following detailed description describing preferred embodiments of the inventive concept(s), simply by way of illustration of the embodiments contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

What is claimed is:
1. An animal watering fountain comprising:
  a manifold for distributing water from a source, said manifold having at least one arm extending to a poultry watering nipple;
  a vertical support pedestal configured for burial into the ground, said vertical support pedestal comprising a tubular member having a coaxial water-carrying conduit therein and wherein an annular interspace is defined between the tubular member and the conduit, wherein the conduit is in fluid communication with the manifold, wherein said water-carrying conduit comprises a vertically oriented pipe configured for connection to a water source;
  a first valve interconnecting the water-carrying conduit and the water source;

a reciprocable actuator rod attached to the first valve and disposed within the annular interspace;

a step positioned outside of said vertical support and configured for vertical movement relative to said vertical support pedestal, wherein said step is configured for poultry to step on said step causing said step to move downward relative to said vertical support pedestal;

wherein said step is operatively connected to said reciprocable actuator rod to cause said reciprocable actuator rod to open said first valve when poultry steps on said step.

2. The watering device of claim 1 wherein said step circumvolves said tubular member and configured to slide along said tubular member to actuate said first valve.

3. The watering device of claim 2 wherein said step is configured to hang from said manifold.

4. The watering device of claim 1 further comprising a second valve configured to drain said manifold and said conduit when said first valve is in the off position.

5. The watering device of claim 1 wherein said manifold comprises four arms, wherein each arm comprises a poultry watering nipple.

6. The watering device of claim 1 wherein said rod is positioned within said conduit.

7. The watering device of claim 1 wherein said manifold is configured to move up and down with the vertical movement of said step.

8. The watering device of claim 7 wherein said step circumvolves said tubular member and is configured to slide along said tubular member to actuate said first valve.

9. The watering device of claim 7 wherein said conduit comprises a water supply boot configured for allowing said manifold to move relative to said conduit.

* * * * *